July 16, 1940.  F. A. WARD  2,207,904

MULTIMOTORED TRUCK

Filed May 26, 1939  2 Sheets-Sheet 1

INVENTOR.
Frederick A. Ward
BY
ATTORNEYS

July 16, 1940.  F. A. WARD  2,207,904
MULTIMOTORED TRUCK
Filed May 26, 1939  2 Sheets-Sheet 2

INVENTOR.
Frederick A. Ward
BY Whittemore Hulbert & Belknap
ATTORNEYS

Patented July 16, 1940

2,207,904

UNITED STATES PATENT OFFICE 2,207,904

MULTIMOTORED TRUCK

Frederick A. Ward, Highland Park, Mich., assignor to Gear Grinding Machine Company, Hamtramck, Mich., a corporation of Michigan Application May 26, 1939, Serial No. 276,010

3 Claims. (Cl. 180—49)

The invention relates to multimotored trucks of that type in which each motor is connected to a separate driving axle, said motors being operable either alternatively or simultaneously. It is usual with such constructions to arrange both driving axles in fairly close proximity to each other in rear of both motors and to arrange non-driven steering wheels forward of said motors. There are, however, occasions when this close proximity of the driving axles is undesirable and where better traction could be obtained by having them spaced farther apart. Also, where both driving axles are in the rear the length of wheel base is necessarily increased over that of a truck with a single driving axle.

It is the object of the instant invention to obtain a construction in which the driving axles are spaced to be respectively forward and in rear of both motors. This permits of operating the vehicle alternatively as a rear axle drive or a front axle drive, so that if for any reason the wheels of one axle lose traction the other axle may be used to overcome the difficulty. The construction has the further advantage that the length of wheel base may be shortened, which is quite desirable for operation under certain conditions. The invention, therefore, consists in the construction and arrangement of parts as hereinafter set forth.

Figure 1:
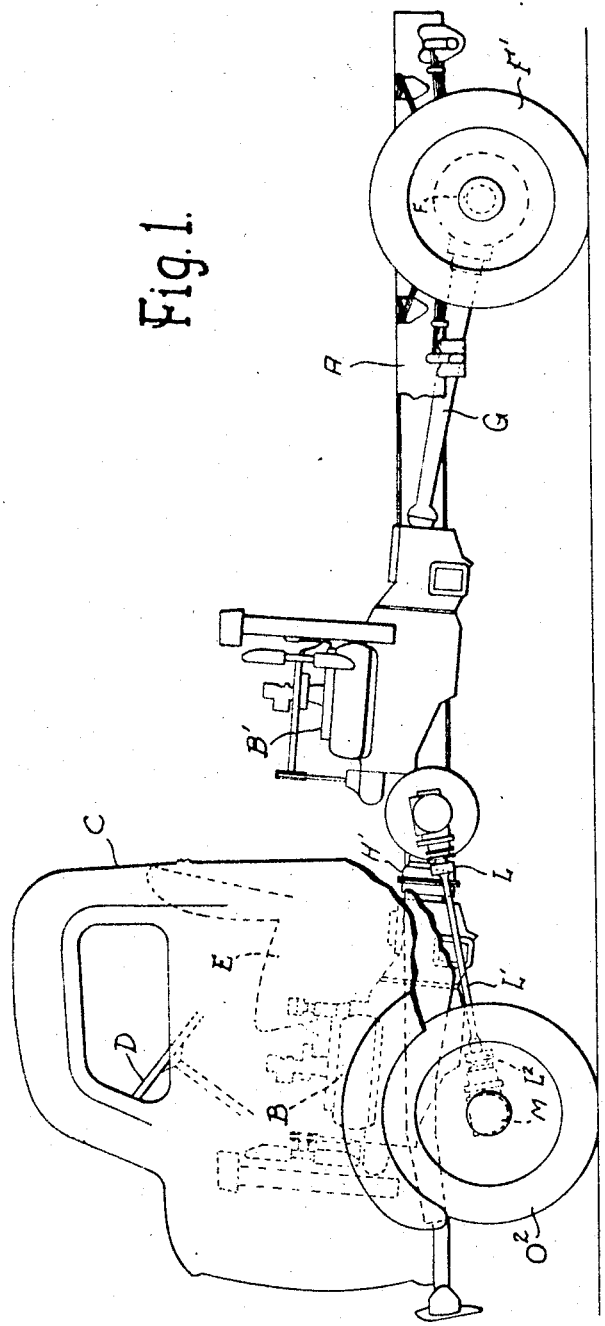
Figure 1 is a side elevation of my improved truck.
Figure 2:
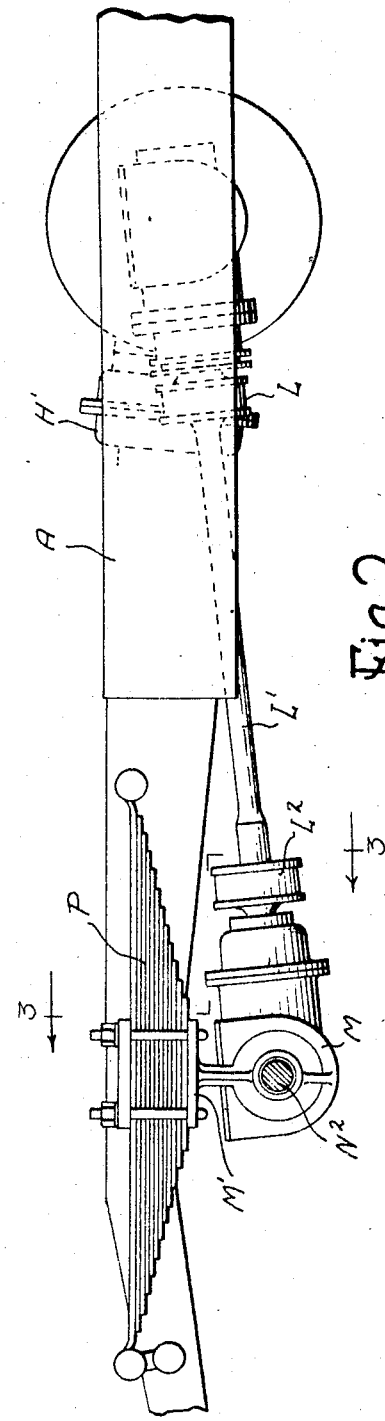
Figure 2 is an enlarged view of a portion of Figure 1.
Figure 4:
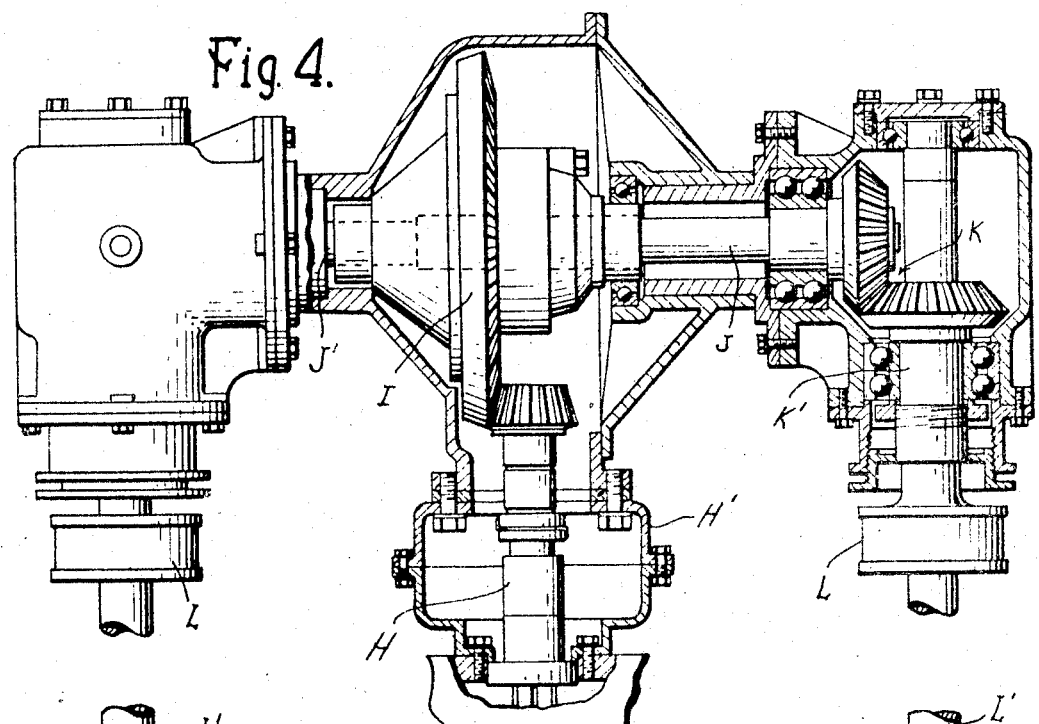
Figure 4 is a plan view, partly in horizontal section, of the driving mechanism for the forward axles.
Figure 3:
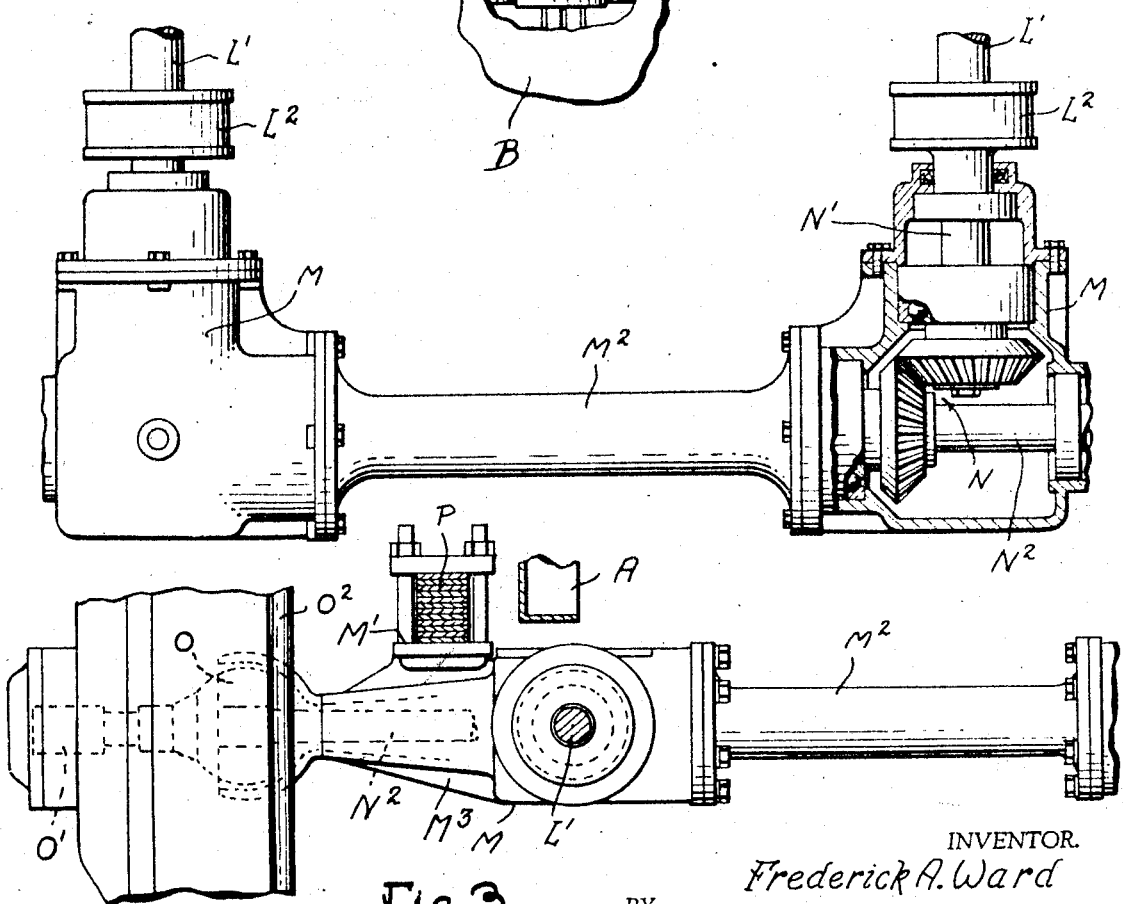
Figure 3 is a cross section substantially on line 3—3 of Figure 2.

My improved truck is so designed that it may be largely formed from standard parts of a single-motored truck, thereby greatly reducing manufacturing costs. The single-motored truck includes a chassis frame A, a motor B mounted on the forward portion of this frame, a cab C arranged to be over the motor, and containing the usual steering wheel D, driver's seat E and other controls (not shown). There is also a rear driving axle F which in the truck as designed, is driven from the motor through a suitable propeller shaft. Starting with this standard truck construction, my improved truck includes a second motor B' which is mounted on the chassis frame in rear of the first motor and the cab. The propeller shaft drive between the first motor and the axle F is disconnected and a shorter propeller shaft G is employed for forming a driving connection between the second motor and said axle. The first motor is then connected through a coupling H in a housing H' with a differential gearing I, which may be a duplicate of that forming a part of the driving axle. This differential gearing and the shafts J and J' driven thereby, together with the enclosing housings therefor, are mounted on the frame A between the motors. At their outer ends the shafts J and J' are connected through beveled gearing K with shafts K' extending longitudinally and forwardly of the frame. The latter shafts are connected through universal joints L with oscillatory propeller shafts L' extending to the forward axle.

Inasmuch as the forward steering wheels are to be driven I substitute for the standard front axle construction the following. M are housings containing beveled gears N which transmit the rotary drive from longitudinally extending shafts N' to the laterally extending axle shafts $N^2$. Each shaft N' is connected by a universal joint $L^2$ with the oscillatory propeller shaft L'. Each shaft $N^2$ is connected through a universal joint O with the axle spindle O' which in turn is connected by a suitable construction (not shown in detail) with the driven steering wheel $O^2$. The housings M have rigid extensions $M^3$ which house the universal joints O and have suitable pivotal connections (not shown) to the steering wheel assemblies being also provided with spring seats M' for the forward springs P supporting the chassis frame. The housings M are further rigidly connected to each other by members $M^2$ extending to the center of the frame.

With the construction as described, it will be understood that the forward and rear driving wheels $O^2$ and F' are independently driven respectively from the motors B and B' through the intermediate transmission mechanisms. Consequently, when the truck is traveling under light load or favorable road conditions only one of these motors is needed for its propulsion. To distribute wear the operator may alternatively use the forward and rear driving mechanisms, while at any time when greater power or speed is required both motors may be simultaneously operated. There are also conditions under which it is more favorable to use one of the driving mechanisms than the other, such for instance where either set of driving wheels must pass an obstacle or where traction is lost by one set of wheels and not by the other. Thus, it is at the option of the driver to use either driving mechanism or both simultaneously.

While I have specifically described a propeller shaft driving connection between the forward motor and the forward driving axles, it is obvious that any other suitable transmission may be used, as for instance a chain drive.

What I claim as my invention is:

1. A motor vehicle comprising a frame, a rear wheeled driving axle and forward wheeled combined driving and steering wheels supporting said frame, a pair of independently operable adjacent motor units mounted on the forward portion of said frame one in advance of the other and with their driven shafts extending longitudinally of the frame, transmission means between the rear motor and rear axle, a pair of aligned transverse shafts and an intermediate differential gearing located in rear of and driven by said forward motor unit, and transmission means between the respective shafts and forward combined steering and driving wheels.

2. The combination with a portion of a standard truck assembly including a frame, a motor unit mounted on the forward portion thereof and a wheeled driving axle assembly supporting the rear end portion of said frame, of a duplicate motor mounted on said frame in rear of the aforesaid motor, a propeller shaft transmission between said duplicate motor and rear driving axle, a portion of a duplicate rear axle assembly mounted in rear of and connected to be driven by the forward motor and including a differential gearing and a pair of aligned transversely extending driven shafts, a pair of combined steering and driving wheeled axle assemblies supporting the forward end portion of said frame, and transmission means between each of said shafts and the corresponding combined steering and driving wheeled axle assemblies.

3. The combination with a portion of a standard truck assembly including a frame, a motor unit mounted on the forward end portion of said frame, a steering and driving wheeled axle assembly for supporting said portion of the frame, and a wheeled driving axle assembly for supporting the rear end portion of said frame, of a duplicate motor unit mounted on the frame in rear of the aforesaid motor unit, a propeller shaft transmission between the rear motor unit and the rear driving wheel axle, a portion of a duplicate rear axle assembly mounted on said frame in rear of the forward motor and having a driving connection therewith, said assembly including a differential gearing and aligned driven axles extending transversely on opposite sides thereof, longitudinally extending shafts adjacent to and having driving connection with the opposite ends of said transversely extending shafts, and a propeller shaft having a universal jointed connection with each of said longitudinally extending shafts and also having a universally jointed connection with the corresponding combined steering and driving wheeled axle assembly.

FREDERICK A. WARD.